Patented July 1, 1947

2,423,121

UNITED STATES PATENT OFFICE 2,423,121

REACTION PRODUCT OF PHENYL MERCURY SALTS WITH HYDROXY ALKYL AMINO COMPOUNDS AND THEIR PREPARATION

Frank J. Sowa, Cranford, N. J.

No Drawing. Application May 16, 1942, Serial No. 443,304

4 Claims. (Cl. 260—433)

This invention relates in general to germicides and in particular to compositions for treating materials such as textiles, paper, leather, rubber, and the like to render them bacteriostatic and fungistatic and to germicidal paints, lacquers and cosmetics.

Germicides for use on materials such as textiles, paper, leather, rubber and the like must be characterized by a number of essential properties, the combination of which in a single chemical compound is difficult to attain. The most essential requisite is that the germicide should have a high toxicity to fungi and bacteria in very dilute solution so that the maximum protection will be obtained with a minimum quantity of material. Consequently, it is essential that a germicide for treating such material should be soluble in a common, inexpensive, readily available solvent, preferably soluble in water or in ethyl alcohol, methyl alcohol, and other common solvents. The third essential characteristic for germicides for such materials is that they must be non-irritating to the human skin when used in wearing apparel or in cosmetics. Other desirable characteristics in a germicide for such materials is that they should not substantially discolor the treated materials. They should be stable upon a long exposure to sunlight and should not chemically react with the treated materials in an adverse manner. Finally, the germicide should exhibit a substantial laundry fastness. The combination of all these properties in a single chemical compound is obviously difficult of attainment.

It is the general object of the present invention to provide a germicide which is characterized by having high toxicity to bacteria and fungi in low concentration, solubility in common solvents and substantially no irritation for the skin.

It is the specific object of the invention to provide a composition for treating textiles, paper, leather, rubber, and the like to render such materials highly bacteriostatic and fungistatic and which cannot be readily removed by washing.

Other objects of the invention will in part be obvious and will in part appear hereinafter.

According to the present invention, a germicide having all the desired characteristics is produced from organic mercurial compounds which contain one or more mercury atoms attached directly to a carbon ring and having the following general formula R—Hg—X in which R is an alicyclic, aromatic, heterocyclic ring structure and X is an anion of an inorganic or organic acid. The organic mercury salts having the formula R—Hg—X are old in the art and no claim is made herein to such salts per se.

The expression "organic mercuric salt" as used in the specification and claims is intended to include all water-soluble organic mercuric salts of inorganic or organic acids as a class, of which there may be given, by way of example, hydrochloric, nitric, sulfuric, but preferably salts which readily hydrolyse, such as salts of acetic acid, butyric acid, lactic acid, malic acid, and the like. Specific examples of some of the mercuric salts used in the invention are phenyl mercuric acetate, phenyl mercuric lactate, and tolyl mercuric malate, and pyridyl mercury butyrate.

In the present invention the organic mercury salts are merely used as one reagent in a process of producing the novel germicide of this invention. Therefore, according to the present invention the water-soluble organic mercury salt is reacted with a liquid organic compound selected from the class consisting of hydroxyl amines.

Of the hydroxyl-amines, there may be given, by way of example, hydroxyl amines per se as a class and hydroxy alkyl amines as a class, such, for example, as monoethanol amine, monomethanol amine, diethanol amine, triethanol amine, and the like.

The new germicide of the invention may be used for coating, impregnating or finishing various materials, especially textiles, paper, leather, foils and articles formed from these materials, such for example, as garments, bandages, surgical dressings, tent cloth, uniforms, corsets, girdles, upholstery material, dress shields, and many other articles. The germicide of the invention may be dissolved in water, alcohol or other suitable solvents and applied to material to be treated by spraying, padding, dipping, back-filling, or by any other suitable method. In the case of non-fibrous foils, the material may be incorporated in the plastic mass and the plastic material extruded in the form of filaments, fabrics, bristles, films, foils, tubing and the like.

In the finishing of textiles, such as fabrics or yarns, it is advisable to add to the composition a thickening agent to increase the viscosity of the solution and to assist in binding the germicide to the textile fibres. This thickening agent may be a known textile sizing or finishing material and may be either a temporary or laundryfast finish, such for example as starch, glue, gelatine, casein, water-soluble cellulose ethers, alkali-soluble cellulose ethers, water-soluble synthetic resins, and water-soluble natural gums, such as gum tragacanth. Accordingly, when using such thickening agents, it is possible by the process of the present invention to both finish and render germicidal a textile yarn or fabric in a single operation.

The germicides of the invention advantageously may be added to paints, lacquers, and other coating compositions, and incorporated in cosmetics, such, for example, as hair tonics, salves, cold creams, and the like.

With hydroxyl amines, the reactions appear to involve the nitrogen atom, as follows:

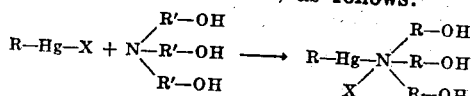

By way of illustration but not by way of limiting the invention, there will be given the following specific examples:

*Example I*

There are mixed together 1250 g. of phenyl mercuric acetate, 4000 cc. of triethanol amine, and 10,000 cc. of water. The phenyl mercuric acetate readily dissolves in the liquid mixture. 100 fluid ounces of the resulting solution is dissolved in 200 gallons of a bath containing starch of the type used in starching clothes. A cotton fabric is passed through the resulting bath in a known manner and then passed through a padder to remove the excess of the solution. The cloth is then dried and heated to 125° C. for several minutes. During this heating the cellulose of the cotton fabric tends to combine with the organic mercury compound as described above. The product will be found to be bacteriostatic.

*Example II*

1000 g. of phenyl mercuric nitrate is dissolved in 3500 cc. of lactic acid and 10,000 cc. of water. 75 fluid ounces of the resulting solution is then added to 100 gallons of an aqueous solution containing 10% water-soluble dimethylol urea. A cellulosic fabric is passed through this solution and is then dried. After the fabric is dried, it may be heated to temperatures sufficiently high to convert the dimethylol urea to an insoluble resin, for example, a temperature of 125° C. The conversion of the resin to the insoluble stage is promoted by the presence of the acid.

Whenever the heating of the treated textile is considered undesirable or not feasible, the germicide may be rendered insoluble after application to the textile by converting the germicide from its water-soluble form to a water-insoluble organic mercury compound. This may be accomplished by passing the treated textile or article into an aqueous solution of a salt or acid which is capable of reaction with the soluble organic mercury compound to produce a water-insoluble organic mercury salt, for example, if the treated material is subjected to the action of soluble chlorides or hydrochloric acid, the organic mercury compound will be converted into organic mercury chloride which is water-insoluble. This embodiment of the invention may be further illustrated by the following specific example.

*Example III*

100 grams of phenyl mercuric acetate is dissolved in 500 cc. of an 80% aqueous solution of lactic acid. The solution is heated to evaporate sufficient acetic acid and water to give a final volume of 440 cc. The resulting solution is then dissolved in 100 gallons of water. A viscose rayon fabric is treated with the solution thus produced so as to pick up 100% by weight of the solution, the fabric is then squeezed and passed into an aqueous solution containing 10% sodium chloride, whereupon the mercury compound is converted to the water-insoluble phenyl mercuric chloride, this compound being formed in situ within the fibres of the fabric. The fabric may then be squeezed, washed, if desired, and finally dried. The treated product will be found to be highly resistant to mildew and entirely washfast with respect to the germicide. If this process is applied to Osnaburg cloth, the treated cloth may be used for sand bags, ground covers, and the like.

The present invention has provided a germicide and a process of rendering bacteriostatic and fungistatic textiles, paper, leather, rubber, and the like in a simple and economical manner. The composition has a high toxicity to fungi and bacteria even in very dilute solution so that the composition may be used in an economical concentration. The composition is soluble in water and may therefore be readily admixed with the aqueous baths which are employed in conventional processes of finishing and treating textiles, paper, and the like. The composition is non-irritating to the human skin when used in wearing apparel or cosmetics and is stable over long periods of time.

Having described my invention, what I claim as new and desire to secure by Letters Patent is:

1. A product resulting from reaction between a water-soluble phenyl mercury compound of the type

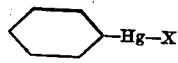

wherein X is an anion of an acid, and a hydroxy alkyl nitrogen compound selected from the group consisting of alkylol amines and alkylolureas.

2. The product resulting from the reaction between a phenyl mercury compound of the type

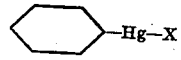

wherein X is an anion of an acid, and an alkylol urea.

3. A product resulting from the reaction of an organic mercury salt of the type

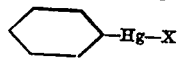

wherein X is an anion of an acid, with dimethylol urea.

4. A method of producing a germicidal product which comprises the steps of reacting an organic mercury salt of the type

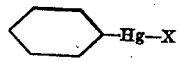

wherein X is an anion of an acid, with dimethylol urea.

FRANK J. SOWA.

REFERENCES CITED

The following references are of record in the file of this patent:

UNITED STATES PATENTS

| Number | Name | Date |
|---|---|---|
| Re. 21,197 | Hill | Sept. 5, 1939 |
| 1,618,372 | Engelmann | Feb. 22, 1927 |
| 1,640,901 | Lieske | Aug. 30, 1927 |
| 1,862,896 | Kharasch | June 14, 1932 |
| 2,056,945 | Anderson | Oct. 13, 1936 |

References continued on next page

| Number | Name | Date |
|---|---|---|
| 2,014,676 | Weed | Sept. 17, 1935 |
| 2,030,927 | Anderson | Aug. 24, 1937 |
| 2,099,888 | Hill | Nov. 23, 1937 |
| 2,157,010 | Perkins | May 2, 1939 |
| 2,165,533 | Bradner | June 11, 1939 |
| 2,275,593 | Muskat | Mar. 10, 1942 |
| 978,145 | Engelmann | Dec. 13, 1910 |
| 2,129,376 | Kharasch | Sept. 6, 1938 |
| 2,157,009 | Perkins | May 2, 1939 |
| 2,241,829 | Six | May 13, 1941 |
| 1,947,519 | Carter | Feb. 20, 1934 |

FOREIGN PATENTS

| Number | Country | Date |
|---|---|---|
| 138,884 | Germany | Feb. 5, 1903 |
| 66,008 | Switzerland | May 19, 1913 |